United States Patent [19]

Vincent et al.

[11] Patent Number: 5,340,887
[45] Date of Patent: Aug. 23, 1994

[54] OXIME-FUNCTIONAL MOISTURE-CURABLE HOT MELT SILICONE PRESSURE-SENSITIVE ADHESIVES

[75] Inventors: Gary A. Vincent, Midland; William P. Brady, Sanford; Martin E. Cifuentes, Midland; William J. Schoenherr, Midland; Harold L. Vincent, Midland, all of Mich.

[73] Assignee: Dow Corning Corporation, Midland, Mich.

[21] Appl. No.: 76,612

[22] Filed: Jun. 11, 1993

[51] Int. Cl.⁵ .......................................... C08F 283/00
[52] U.S. Cl. ..................................... 525/477; 528/17; 528/18
[58] Field of Search ..................... 525/477; 528/17, 18

[56] References Cited

U.S. PATENT DOCUMENTS

| | | | |
|---|---|---|---|
| 4,143,088 | 3/1979 | Favre | 260/825 |
| 4,865,920 | 9/1989 | Sweet | 428/447 |
| 4,882,377 | 11/1989 | Sweet | 524/267 |
| 5,013,781 | 5/1991 | Koshii | 524/864 |
| 5,091,484 | 2/1992 | Colas | 525/477 |
| 5,147,916 | 9/1992 | Sweet | 524/266 |
| 5,162,410 | 11/1992 | Sweet | 524/266 |
| 5,208,300 | 5/1993 | Krahnke | 525/474 |

FOREIGN PATENT DOCUMENTS 481487 3/1992 Japan.
5140458 6/1993 Japan.

*Primary Examiner*—Melvyn I. Marquis
*Attorney, Agent, or Firm*—Alexander Weitz; Sharon K. Severance

[57] ABSTRACT

A moisture-curable silicone hot-melt adhesive composition is disclosed, which composition comprises
(i) a solid hydroxyl-functional organopolysiloxane resin comprising $R_3SiO_{\frac{1}{2}}$ siloxane units and $SiO_{4/2}$ siloxane units in a molar ratio of 0.5/1 to 1.2/1, wherein R is selected from hydrocarbon or halogenated hydrocarbon radicals;
(ii) a diorganopolysiloxane polymer having silicon-bonded hydroxyl terminal groups and having a viscosity at 25° C. of 100 to 500,000 centipoise, the weight ratio of said resin (i) to said polymer being (ii) in the range 40:60 to 75:25;
(iii) a ketoximosilane, the amount of said ketoximosilane being sufficient to provide a molar ratio of X groups to total hydroxyl groups on said resin (i) and said diorganopolysiloxane (ii) of 0.9 to 3; and
(iv) optionally, sufficient catalyst to accelerate the cure of said composition, said composition being an essentially solvent-free non-slump solid at room temperature, being extrudable at ≦150° C. and forming an essentially tack-free elastomer when cured.

22 Claims, No Drawings

OXIME-FUNCTIONAL MOISTURE-CURABLE HOT MELT SILICONE PRESSURE-SENSITIVE ADHESIVES

FIELD OF THE INVENTION

The present invention relates to a silicone pressure-sensitive adhesive composition. More particularly, the invention relates to an oxime-functional hot melt adhesive which cures upon exposure to ambient moisture.

BACKGROUND OF THE INVENTION

Silicone pressure-sensitive adhesives (hereinafter also referred to as PSAs) typically contain at least two primary components, namely a linear siloxane polymer and a tackifier resin consisting essentially of triorganosiloxane (M) units (i.e., $R_3SiO_{\frac{1}{2}}$ units, in which R denotes a monovalent organic group) and silicate (Q) units (i.e., $SiO_{4/2}$ units). In addition to the above two ingredients, silicone PSA compositions are generally provided with some crosslinking means (e.g., peroxide or hydrosilation cure systems) in order to optimize various properties of the final adhesive product. In view of the high viscosity imparted by the polymer component, these PSA compositions are typically dispersed in an organic solvent for ease of application.

U.S. Pat. No. 4,865,920 to Sweet describes solventless silicone PSAs that can be applied as a heated melt, also referred to as a hot melt. These compositions differ from prior art PSAs by replacement of the gum type polydiorganosiloxane with a liquid polydiorganosiloxane and by addition of from 1 to 10 percent, based on the combined weight of the organosilicon compounds, of a liquid ester of a monocarboxylic acid containing from 2 to 32 carbon atoms. Replacing this ester with a phenyl-containing polyorganosiloxane fluid to make the PSA more compatible with drugs and other organic materials is described in U.S. Pat. No. 5,162,410, also to Sweet. The hot melt PSAs described in both Sweet patents do not contain moisture reactive groups capable of forming a cured material, and therefore remain flowable at elevated temperatures and retain their tacky character.

A copending application, Ser. No. 07/748,478, filed on Aug. 22, 1991 (EP Publication 529841 A1) to Krahnke et al. describes silicone PSAs that cure in the presence of moisture to permanent adhesives. The compositions are particularly useful as structural adhesives for adhering glass panels to structural materials such as concrete, aluminum and steel. The two required ingredients of the PSA are an MQ resin and a high consistency polydiorganosiloxane gum. One or both ingredients of the PSA compositions described in this copending application contain moisture activated alkoxy curing groups. Due to the high viscosity of gum type polydiorganosiloxanes even at elevated temperatures, the compositions are not suitable for application as heated molten materials and are typically applied in solution form wherein the solvent is removed prior to curing of the composition or evaporates during the curing reaction.

Another moisture-curable PSA system is disclosed in Japanese laid open patent application (Kokai) No. 4(1992)/81,487. These SAs comprise (1) 100 parts by weight of an MQ resin having a hydroxyl content of up to 0.7 weight percent, (2) a liquid polydiorganosiloxane containing hydrolyzable terminal groups and (3) a condensation catalyst to promote curing of the composition in the presence of moisture. The molar ratio of silanol groups in the resinous copolymer to hydrolyzable terminal groups in the liquid polydiorganosiloxane is from 1 to 10. A characterizing feature of these compositions is their ability to retain the characteristics of pressure sensitive adhesives under both dry and wet conditions following reaction of the moisture reactive groups.

U.S. Pat. No. 5,091,484 to Colas et al. describes elastomer-forming compositions containing (1) a hydroxyl- or alkoxy-terminated polydiorganosiloxane, (2) an alkoxy-functional MQ resin that is preferably liquid under ambient conditions and (3) a titanium-containing curing catalyst. These compositions are described as flowable under ambient conditions and cure in the presence of atmospheric moisture to yield elastomeric materials.

Moisture-curable compositions which cure to elastomers are also disclosed by Favre et al. in U.S. Pat. No. 4,143,088. These compositions are prepared by mixing (a) a hydroxyl-terminated polydiorganosiloxane, (b) an MQ resin, (c) an alkoxylated organosilicon compound and (d) an organic titanium derivative. Before being cured, these systems are liquids under ordinary conditions.

With the current emphasis on the control of volatile organic compound (VOC) emission, the use of conventional PSAs is losing favor and there is an ever growing need for PSAs which contain little or no solvent. Furthermore, many applications require that an essentially instant bond be formed between parts so that the parts can be transported or otherwise manipulated without waiting for a solvent to evaporate or the composition to cure. This characteristic is defined herein as "green strength" and is manifested by high initial adhesive strength of the PSA.

SUMMARY OF THE INVENTION

The above noted needs are simultaneously addressed by the PSA compositions of the present invention, these compositions having a high level of instant tack and green strength as well as being essentially solvent-free. Additionally, the PSAs disclosed herein are non-slump solids under ambient conditions but can be heated to a flowable liquid state and applied as such to substrates by methods now employed to dispense hot melt organic adhesives. Further, the instant PSAs, which can be stored as one-part systems for extended periods, cure to essentially non-tacky elastomers when exposed to moisture, the cured composition providing an even stronger bond than its corresponding green strength value. Unlike compositions which remain PSAs after cure, the cured compositions of the present invention can be handled after curing and they exhibit limited dirt pick-up and contamination when an excess of the material overflows the intended bond area. Such contamination is undesirable from an aesthetic perspective as well as from performance considerations when the compositions are used in electronic applications. Preferred hot melt PSAs of the invention additionally provide cured systems which show a surprisingly high adhesion at elevated temperatures. Furthermore, the PSAs have a long "open time," this term being defined as the time between dispensing the adhesive and using it to bond substrates wherein the tack of the PSA is essentially preserved.

The present invention therefore relates to a moisture-curable silicone hot melt pressure-sensitive adhesive composition comprising:

(i) a solid hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1, R is selected from the group consisting of hydrocarbon radicals and halogenated hydrocarbon radicals;

(ii) a diorganopolysiloxane polymer having silicon-bonded hydroxyl terminal groups and having a viscosity at 25° C. of 100 to 500,000 centipoise, the weight ratio of said resin (i) to said polymer being (ii) in the range 40:60 to 75:25;

(iii) a ketoximosilane of the formula $R'_{4-y}SiX_y$, wherein R' is selected from the group consisting of hydrocarbon radicals and halogenated hydrocarbon radical, X is a $-ON=C(R'')R'''$, in which R'' and R''' are selected from the group consisting of alkyl radicals having 1-8 carbon atoms and phenyl radical, and y is 3 or 4, the amount of said ketoximosilane being sufficient to provide a molar ratio of X groups to total hydroxyl groups on said resin (i) and said diorganopolysiloxane (ii) of 0.9 to 3; and (iv) optionally, sufficient catalyst to accelerate the cure of said composition, said composition being an essentially solvent-free non-slump solid at room temperature and being extrudable at ≦150° C.

DETAILED DESCRIPTION OF THE INVENTION component (i) of the present invention is a soluble, hydroxyl-functional organopolysiloxane resin comprising $R_3SiO_{\frac{1}{2}}$ siloxane units and $SiO_{4/2}$ siloxane units. By the term soluble it is meant that the organopolysiloxane can be dissolved, substantially completely, in either a hydrocarbon liquid such as benzene, toluene, xylene, heptane and the like or in a silicone liquid such as cyclic or linear polydiorganosiloxanes. Preferably the resin is soluble in component (ii), delineated below.

In the formula for resin (i), R denotes a monovalent radical selected from the group consisting of hydrocarbon and halogenated hydrocarbon radicals, preferably having less than 20 carbon atoms, and most preferably having from 1 to 10 carbon atoms. Examples of suitable R radicals include alkyl radicals, such as methyl, ethyl, propyl, pentyl, octyl, undecyl and octadecyl; cycloaliphatic radicals, such as cyclohexyl; aryl radicals such as phenyl, tolyl, xylyl, benzyl, alpha-methyl styryl and 2-phenylethyl; alkenyl radicals such as vinyl; and chlorinated hydrocarbon radicals such as 3-chloropropyl and dichlorophenyl.

To enhance the solubility of component (i) in component (ii), described infra, it is desirable to select the predominant organic radicals of the former to match the predominant organic radicals of the latter. Preferably, at least one-third, and more preferably substantially all R radical in the formula for component (i), are methyl radicals. Examples of preferred $R_3SiO_{\frac{1}{2}}$ siloxane units include $Me_3SiO_{\frac{1}{2}}$, $PhMe_2SiO_{\frac{1}{2}}$ and $Ph_2MeSiO_{\frac{1}{2}}$ where Me hereinafter denotes methyl and Ph hereinafter denotes phenyl.

Component (i) includes a resinous portion wherein the $R_3SiO_{\frac{1}{2}}$ siloxane units (i.e., M units) are bonded to the $SiO_{4/2}$ siloxane units (i.e., Q units), each of which is bonded to at least one other $SiO_{4/2}$ siloxane unit. Some $SiO_{4/2}$ siloxane units are bonded to hydroxyl radicals resulting in $HOSiO_{3/2}$ units (i.e., TOH units), thereby accounting for the silicon-bonded hydroxyl content of the organopolysiloxane. In addition to the resinous portion, component (i) can contain a small amount of a low molecular weight material comprised substantially of a neopentamer organopolysiloxane having the formula $(R_3SiO)_4Si$, the latter material being a byproduct in the preparation of the resin according to the methods of Daudt et al., described infra.

For the purposes of the present invention, the ratio of $R_3SiO_{\frac{1}{2}}$ siloxane units to $SiO_{4/2}$ siloxane units has a molar ratio of 0.5 to 1.2, respectively. It is preferred that the mole ratio of the total M siloxane units to total Q siloxane units of (i) be between 0.6 and 0.8. The above M/Q mole ratios can be easily obtained by $^{29}Si$ nuclear magnetic resonance, this technique being capable of a quantitative determination of the molar contents of: M (resin), M(neopentamer), Q (resin), Q(neopentamer) and TOH. For the purposes of the present invention, as implicitly stated supra, the M/Q ratio {M(resin)+M(neopentamer)}/{Q(resin)+Q(neopentamer)} represents the ratio of the total number of triorganosiloxy groups of the resinous and neopentamer portions of (i) to the total number of silicate groups of the resinous and neopentamer portions of (i). It will, of course, be understood that the above definition of the M/Q mole ratio accounts for the neopentomer resulting from the preparation of resin (i) and not for any intentional addition of neopentomer.

Resin (i) of the instant invention must be a solid at room temperature. That is, it must have a softening point above ambient, preferably above 40° C. When this condition is not realized, the PSAs obtained do not exhibit the required non-slump character, as defined infra.

It is further preferred that the resinous portion of component (i) have a number average molecular weight ($M_n$) of about 4,000 to 7,500 when measured by gel permeation chromatography (GPC), the neopentamer peak being excluded from the measurement. In this molecular weight determination, narrow fractions of MQ resins are used to calibrate the GPC equipment, the absolute molecular weights of the fractions being first ascertained by a technique such as vapor phase osmometry. This molecular weight is preferably above about 3,000, most preferably about 4,500 to 7,500, since the thermal hold of the resulting cured adhesive is significantly greater than when the $M_n$ is less than about 3,000 and the hydroxyl content of the resin is >1% by weight. The term "thermal hold" is defined herein as the adhesive strength of the cured PSA at elevated temperatures (e.g., 150° C.).

Component (i) can be prepared by well known methods. It is preferably prepared by the silica hydrosol capping process of Daudt, et al., U.S. Pat. No. 2,676,182; as modified by Brady, U.S. Pat. No. 3,627,851; and Flannigan, U.S. Pat. No. 3,772,247; each patent being incorporated herein by reference to teach how to prepare soluble organopolysiloxanes which meet the requirements of the present invention. These methods employ an organic solvent, such as toluene or xylene, and provide a solution wherein the resin typically has a hydroxyl content over one percent (based on the weight of resin solids), this value preferably being 2 to 4 percent by weight. The resulting resin can be used in the instant compositions without further modification or it can be capped with trialkylsiloxy groups to reduce the silanol content. This can be accomplished by well known methods, such as reacting the resin with, e.g., trimethylchlorosilane or hexamethyldisilazane.

Component (ii) of the present invention is a hydroxyl-terminated diorganopolysiloxane polymer. The repeat units of diorganopolysiloxane (ii) are $R_2SiO_{2/2}$ siloxy units wherein R is independently selected from the same hydrocarbon and halogenated hydrocarbon radicals delineated above for component (i). This component can comprise a single polymer or copolymer or it can be a mixture of two or more such polymers. For the purposes of the present invention, each polydiorganosiloxane polymer should have a viscosity at 25° C. of about 100 to 500,000 centipoise (cP), preferably 500 to 50,000 and most preferably 1,000 to 10,000 cP. It is preferred that at least 50%, and preferably at least 85%, of the organic radicals along the chain of component (ii) are methyl radicals, which radicals can be distributed in any manner in the diorganopolysiloxane. Further, component (ii) can comprise up to about 10 mole percent of siloxane branching sites provided it meets the above viscosity requirements.

Ketoximosilane (iii) of the present invention is represented by the formula $R'_{4-y}SiX_y$, in which R' is selected from the group consisting of hydrocarbon radicals and halogenated hydrocarbon radical having 1-10 carbon atoms. Preferably, R' is methyl, vinyl or phenyl. In the above formula y is 3 or 4 and X represents a ketoxime group of the general formula —ON=C(R")R"', in which each R" and R"' represents an alkyl radical having 1-8 carbon atoms or a phenyl radical. Specific examples of preferred silanes include methyl-tris(methylethylketoximo)silane, vinyl-tris(methylethylketoximo)silane and tetrakis(methylethylketoximo)silane, inter alia.

The catalyst (iv) which may be used to accelerate the cure of the instant compositions upon exposure to moisture may be selected from those compounds known in the art to promote both the hydrolysis of ketoxime groups and subsequent condensation of hydroxyl groups on silicon. Suitable curing catalysts include tin IV salts of carboxylic acids, such as dibutyltin dilaurate, and organotitanium compounds such as tetrabutyl titanate and partially chelated derivatives of these salts with chelating agents such as acetoacetic acid esters and beta-diketones.

In the compositions of the present invention, the weight ratio of resin (i) to diorganopolysiloxane polymer (ii) is about 40:60 to 75:25, preferably 50:50 to 70:30 and most preferably 55:45 to 65:35. When this ratio is below about 40/60, the compositions are fluids which do not exhibit the required non-slump character. When this ratio is above about 75:25, the compositions frequently are not extrudable from a hot melt gun at a temperature $\leq 150°$ C. The precise ratio needed to meet the requirements of the instant PSA compositions can be ascertained for a given resin and polymer combination by routine experimentation based on the instant disclosure. By non-slump it is meant that the material appears to be a solid as determined by the following simple procedure. A U-shaped bead of the composition having a diameter of about 6 mm is extruded and inverted on a flat horizontal surface so as to form an arch measuring approximately 20×20 mm. This configuration is allowed to cure at room temperature (i.e., about 25° C.) and is deemed a solid if it does not significantly deform. This non-slump condition has been correlated to a minimum room temperature dynamic viscosity of the order of $10^7$ cP when measured at 1 radian/second.

Thus, for example, at a viscosity of about $4 \times 10^6$ samples slumped by the above test and are referred to as "pastes" herein. When heated to a temperature of $\leq 150°$ C., the compositions of the present invention can readily be extruded from a conventional hot melt gun without significant decomposition. Preferably, the dynamic viscosity (at 1 radian/second) of the H composition is no more than approximately $2 \times 10^4$ cP at 150° C.

Ketoximosilane (iii) is employed in the instant compositions at a level sufficient to provide a molar ratio of X groups on the ketoximosilane to total hydroxyl groups on said resin (i) and said diorganopolysiloxane (ii) of 0.9 to 3. When this ratio is below about 0.9 the compositions are unstable and gel, either during preparation or shortly thereafter. When this ratio is greater than about 3 no benefit is obtained and the excess ketoximosilane is typically removed during devolatilization, as described infra. Furthermore, excess ketoximosilane has been observed to impart an undesirable brittle or "crumbly" character to some final cured products. It is preferred that the molar ratio of X groups to total hydroxyl groups be about 1.2 to 2.1 for maximum stability of the PSA composition.

Finally, a sufficient quantity of catalyst (iv) may be added to accelerate the cure of said composition. This amount can readily be determined by the skilled artisan through routine experimentation and is typically about 0.1 to 1.0 percent based on the weight of the total composition.

The PSA compositions of the present invention are prepared by thoroughly blending an organic solvent solution of resin (i) with polydiorganosiloxane (ii), preferably at room temperature. The solvent employed is preferably the one used to prepare the resin component, as described supra, and is used in an amount sufficient to achieve miscibility between the resin and polydiorganosiloxane. To this mixture, there is quickly added ketoximosilane (iii) to form a homogeneous solution. The solvent is then immediately stripped off to provide an essentially solvent-free hot melt PSA composition of the invention. The catalyst (iv) may be added, if desired, to this stripped product. Alternatively, a catalyst such as stannous octoate can be added just prior to the stripping step to body the resin-polymer combination. It has been observed that this bodying can improve the green strength of the resulting hot melt PSA. The above mentioned stripping (devolatilization) can be effectively accomplished by heating the mixture under vacuum, for example at 120° C. to 150° C. and <10 millimeters of mercury in a batch operation. The removal of solvent can also be accomplished by any of the known techniques, such as contact with a stream of inert gas, evaporation, distillation, thin film stripping, and the like. Excessively high temperatures should be avoided when all the components are being devolatilized. A temperature of 200° C., and preferably 150° C., should not be exceeded.

It is, of course, understood that the above procedures are to be carried out in the absence of moisture in order to prevent premature curing of the compositions. This also applies to subsequent storage of the compositions.

In general, small amounts of additional ingredients may be added to the compositions of this invention. For example, antioxidants, pigments, stabilizers, fillers, etc., may be added as long as they do not materially alter the requirements stipulated herein.

Hot melt PSA compositions according to the instant invention may be applied to various substrates by techniques currently employed for dispensing organic hot melt formulations (e.g., hot melt gun, spraying, extrusion spreading via heated draw-down bars, doctor blades or calendar rolls). The common factor in these methods is that the composition is heated to a temperature sufficient to induce flow before application. Upon cooling to ambient conditions, the compositions of the present invention are non-slump PSAs of high green strength which may be used to bond components or substrates to one another. Alternatively, the bonding can take place while the adhesive is still hot, but the latter will not, of course, support much stress under these conditions and the bonded parts would have to be held in place until the PSA cooled. After the desired components are bonded with the PSA of the invention, the combination is exposed to moist air so as to cure the PSA to an essentially non-tacky elastomer. Essentially tack-free herein indicates that the surface does not exhibit a measurable degree of tack and feels dry or nearly dry to the touch. The time required for completion of this cure process ranges from several hours to several weeks, depending upon whether catalyst is employed, the catalyst type, catalyst level, temperature and humidity, inter alia. As a result of this cure, the adhesive strength of the instant compositions is greatly augmented.

The compositions of this invention find utility in many of the same applications as now being served by silicone PSAs and/or organic hot melt adhesives, particularly in such industries as automotive, electronic, construction, medical, electrical and space, inter alia. In these areas of application, the instant PSAs provide bonds which are resistant to hostile environments, such as heat and moisture.

EXAMPLES

The following examples are presented to further illustrate the compositions of this invention, but are not to be construed as limiting the invention, which is delineated in the appended claims. All parts and percentages in the examples are on a weight basis and all measurements were obtained at 25° C., unless indicated to the contrary.

The following components, listed alphabetically for ease of reference, were used in the examples.

Catalyst A = diisopropoxy di(ethoxyacetoacetyl) titanate.

Fluid A = hydroxyl-ended polydimethylsiloxane fluid having a degree of polymerization of about 600 and a viscosity of about 4,000 cP.

Fluid B = hydroxyl-ended polydimethylsiloxane fluid having a viscosity of about 50,000 cP.

Fluid C = hydroxyl-ended polydimethylsiloxane fluid having a viscosity of about 13,500 cP.

Fluid D = hydroxyl-ended polydimethylsiloxane fluid having a viscosity of about 80 cP.

Fluid E = hydroxyl-ended polydimethylsiloxane fluid having a viscosity of about 750 cP.

Fluid F = hydroxyl-ended polydimethylsiloxane fluid having a viscosity of about 1,000,000 cP.

MTO = methyl-tris(methylethylketoximo)silane of the formula $MeSi(ON=C(Et)Me)_3$, in which Et denotes an ethyl radical.

Resin 1 = a 72% solution in xylene of a solid MQ resin consisting essentially of trimethylsiloxy units and $SiO_{4/2}$ unit in a molar ratio of about 0.63:1 and having a silicon-bonded hydroxyl content of about 3.7 weight percent and a number average molecular weight ($M_n$) of about 5,000.

Resin 2 = a 62% solution in xylene of Resin 1 wherein the resin has been capped with trimethylsiloxy groups so as to provide a residual silicon-bonded hydroxyl content of about 0.5 weight percent.

Resin 3 = a 71% solution in xylene of a solid MQ resin consisting essentially of trimethylsiloxy units and $SiO_{4/2}$ unit having a silicon-bonded hydroxyl content of about 3.4 weight percent and $M_n$ of about 4,100.

Resin 4 = an 81% solution in xylene of a solid MQ resin consisting essentially of trimethylsiloxy units and $SiO_{4/2}$ unit in a molar ratio of about 1.1:1 and having a silicon-bonded hydroxyl content of about 3.2 weight percent and $M_n$ of about 2,700.

The number average molecular weight of the above described resins was determined by gel-permeation chromatography (GPC) using Varian TSK 4000+2500 columns at 35° C., a chloroform mobile phase at 1 mL/min and an IR detector set at 9.1 microns to detect Si—O—Si. The GPC was calibrated using narrow fractions of similar resins as standards. The $M_n$ values reported herein exclude any neopentamer, $(Me_3SiO)_4Si$, present in the resin component.

The trimethylsiloxy/$SiO_{4/2}$ ratio of the resins was determined by $^{29}Si$ nmr and, in this case, the reported results include any neopentamer component present in the resin. The hydroxyl content of the resins was determined by FTIR analysis.

ADHESION TESTING

Adhesive strength of PSA compositions was determined as a function of cure time under ambient conditions using a plastic box construction. The box construction comprised four integrally-formed side walls and a detachable, form-fitting bottom plate. The box had a generally rectangular cross-section measuring 3.5 cm wide×6 cm long, had a wall height of 1.5 cm and had a wall thickness of 5 mm. Each side wall had a 3 mm wide recessed step along its bottom interior edge for receiving said bottom plate such that the exterior surface of the latter was flush with said edges when seated on said step.

In a typical adhesion evaluation, the plate was detached and a thin bead of molten PSA was extruded from a heated metal cartridge (approximately 150° C.) along the 3 mm wide step. The bottom plate was pressed into place so as to contact the adhesive on the step and thereby provide a box having an open top. The box additionally had external protrusions in two of its opposite walls which allowed it to be constrained in a special jig while the bottom plate was pushed out with the ram of an arbor press apparatus, the apparatus having been modified to measure the applied force. The force necessary to push the bottom out of the wall section was recorded after storage at ambient conditions for at least seven days to asses adhesion and its improvement with cure.

EXAMPLES 1-30

Fluid A and Resin 1 were thoroughly mixed in a 3-necked reaction flask in the weight proportions shown in Table 1 under the heading of "R/P." In this table, and in the subsequent tables, this R/P ratio is reported on a solids basis. To each mixture, there was added MTO based on the total silanol content of the resin and polymer components and this ketoximosilane was dispersed in the mixture. The molar ratio of the ketoximosilane to silanol is shown in Table 1 under the heading "MTO/SiOH." It will be noted that this molar ratio is one third the value of the ratio ketoxime group to hydroxyl since the MTO contains three ketoxime groups. Each of these systems was catalyzed with 0.3% of Catalyst A based on the total solids content, whereupon each mixture was simultaneously stirred and devolatilized at a pressure of 5–10 mm Hg and a temperature of 150° C. for about 45 to 60 minutes. Once devolatilized, each system was restored to atmospheric pressure. These compositions were transferred to a metal cartridge, applied to box constructions and tested after a seven day cure cycle, as described above. Additionally, some of the PSAs were tested for tensile adhesion to glass after a four week cure cycle according to ASTM C 1135, the results of both tests being presented in Table 1.

TABLE 1

| Example | R/P | MTO/SiOH | PSA Consistency | Box Const. (Pounds) | Tensile Adh. (psi) |
|---|---|---|---|---|---|
| 1 | 30/70 | 0.2 | G | — | — |
| 2 | | 0.3 | F | 60 | 0 |
| 3 | 40/60 | 0.2 | G | — | — |
| 4 | | 0.3 | H | 93 | 17 |
| 5 | | 0.4 | P | 98 | 48 |
| 6 | | 0.6 | P | 138 | 47 |
| 7 | | 0.9 | P | 160 | 36 |
| 8 | 50/50 | 0.2 | G | — | — |
| 9 | | 0.3 | H | 140 | 60 |
| 10 | | 0.4 | P | 36 | 91 |
| 11 | | 0.6 | P | 207 | 118 |
| 12 | | 0.9 | P | — | 75 |
| 13 | 60/40 | 0.2 | G | — | — |
| 14 | | 0.3 | S | — | — |
| 15 | | 0.4 | H | 156 | 294 |
| 16 | | 0.5 | H | 229 | 231 |
| 17 | | 0.6 | P | — | 179 |
| 18 | | 0.9 | P | 214 | 154 |
| 19 | 63/37 | 0.4 | H | 163 | 232 |
| 20 | 70/30 | 0.3 | S | — | — |
| 21 | | 0.4 | S | — | — |
| 22 | | 0.5 | S | — | — |
| 23 | | 0.6 | H | — | 0 |
| 24 | | 0.7 | H | 50 | 136 |
| 25 | | 0.9 | H | 40 | 0 |
| 26 | | 1.0 | P | 30 | 0 |
| 27 | 80/20 | 0.4 | S | — | — |
| 28 | | 0.6 | S | — | — |
| 29 | | 0.8 | H | — | 0 |
| 30 | | 1.0 | S* | — | — |

*data considered uncertain

In the above table, and hereinafter, the following code is used to designate the consistency of the resulting PSA composition:

G = mixture gelled during preparation of shortly thereafter.
F = mixture was a fluid.
P = mixture was a flowable paste (i.e. a suspension of solid particles in liquid matrix).
H = mixture was a hot melt PSA (i.e., non-slump solid at 25° C., readily extruded at 150° C. from a hot-melt gun, and cured to non-tacky elastomers upon exposure to ambient moist air).
S = mixture was a solid which could not be extruded at 150° C.

The above examples illustrate the need for routine experimentation to determine the exact ketoximosilane/SiOH molar ratio required to obtain a hot melt PSA for a given resin/polymer ratio. It is seen that, even though a resin/polymer ratio as high as 80:20 can provide a hot melt PSA, such a high resin content results in systems having poor adhesion.

EXAMPLES 31–37

Compositions were prepared and tested as in Example 1 with the exception that Fluid B was substituted for Fluid A. The formulations and test results for this series of experiments are shown in Table 2.

TABLE 2

| Example | R/P | MTO/SiOH | PSA Consistency | Box Const. (Pounds) | Tensile Adh. (psi) |
|---|---|---|---|---|---|
| 31 | 30/70 | 0.4 | F | — | 0 |
| 32 | | 0.6 | F | — | 25 |
| 33 | | 0.8 | F | — | 39 |
| 34 | | 1.0 | F | — | 19 |
| 35 | 70/30 | 0.4 | S | — | — |
| 36 | | 0.6 | H | — | 156 |
| 37 | | 0.8 | H | — | 193 |

EXAMPLES 38–40

Compositions were prepared and tested as in Example 1 with the exception that Fluid C was substituted for Fluid A. The formulations and test results for this series of experiments are shown in Table 3.

TABLE 3

| Example | R/P | MTO/SiOH | PSA Consistency | Box Const. (Pounds) | Tensile Adh. (psi) |
|---|---|---|---|---|---|
| 38* | 62/38 | 0.44 | H | 112 | — |
| 39* | 64/36 | 0.44 | H | 170 | — |
| 40* | 66/34 | 0.44 | H | 158 | — |

*No catalyst was employed.

EXAMPLES 41–42

Compositions were prepared and tested as in Example 1 with the exception that Resin 2 was substituted for Resin 1. The formulations and test results for this series of experiments are shown in Table 4.

TABLE 4

| Example | R/P | MTO/SiOH | PSA Consistency | Box Const. (Pounds) | Tensile Adh. (psi) |
|---|---|---|---|---|---|
| 41 | 63/37 | 0.4 | H | 180 | 48 |
| 42 | 63/37 | 0.8 | H | 210 | 85 |

EXAMPLES 43–44

Compositions were prepared and tested as in Example 1 with the exception that Resin 3 was substituted for Resin 1. The formulations and test results for this series of experiments are shown in Table 5.

TABLE 5

| Example | R/P | MTO/SiOH | PSA Consistency | Box Const. (Pounds) | Tensile Adh. (psi) |
|---|---|---|---|---|---|
| 43 | 63/37 | 0.44 | H | — | — |
| 44* | 50/50 | 0.68 | P | 178 | — |

*No catalyst used.

Example 44 again illustrates the situation wherein too high a ratio of MTO/SiOH was employed to obtain a hot melt, even though this ratio is within the general requirement of the invention.

EXAMPLES 45–47

Compositions were prepared as in Example 1 with the exception that Fluid D was substituted for Fluid A. The formulations for this series of experiments are shown in Table 5.

TABLE 5

| Example | R/P | MTO/SiOH | PSA Consistency | Box Const. (Pounds) | Tensile Adh. (psi) |
|---|---|---|---|---|---|
| 45 | 60/40 | 0.5 | P | — | — |
| 46 | 65/35 | 0.5 | P | — | — |
| 47 | 63/37 | 0.4 | P | — | — |

Although these formulations contained resin to polymer ratios in the preferred range, they did not form hot melt PSAs and illustrate the need to use a polymer having a viscosity of at least about 100 cP.

EXAMPLE 48

A composition was prepared as in Example 45 with the exception that Fluid F was substituted for Fluid D. This formulation was a solid which could not be extruded in a hot melt gun even at 200° C. Again, this illustrates the need to use a polymer having a viscosity of no greater than about 500,000 cP.

EXAMPLE 49

The composition of Example 47 was prepared wherein Fluid E was substituted for Fluid D and the MTO/SiOH molar ratio was changed to 0.45. This formulation produced a hot melt PSA according to the invention.

EXAMPLE 50

Fluid A and Resin 1 were used to prepare hot melt PSAs having an R/P ratio of 63/37 and an MTO/OH ratio of 0.44. Sample A was prepared according to the method described in Example 1 but a catalyst was not added. Sample B was prepared in a similar manner, but 0.25% (based on total resin and polymer solids) of a stannous octoate catalyst was added to the resin/polymer solution before this combination was stripped. The resulting PSAs were tested in box constructions wherein and the initial adhesion (i.e., green strength) as well as the adhesion after a partial cure (24 hours) was obtained, these values being shown in Table 6.

TABLE 6

| Sample | Adhesion by Box Construction Test (Pounds) | |
|---|---|---|
| | Initial | After 24 Hour Cure |
| A | 20 | 148 |
| B | 60 | 206 |

This example illustrates the high green strength of the instant composition and how this property can be augmented by adding a catalyst before stripping off solvent.

Numerous additional preparations using Fluids A in combination with Resins 1, Resin 3 or Resin 4 at different R/P ratios resulted in gels during preparation, or shortly thereafter, when the molar MTO/SiOH ratio was below 0.3.

That which is claimed is:

1. A moisture-curable silicone hot-melt adhesive composition comprising:
   (i) a solid hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1, R is selected from the group consisting of hydrocarbon radicals and halogenated hydrocarbon radicals;
   (ii) a diorganopolysiloxane polymer having silicon-bonded hydroxyl terminal groups and having a viscosity at 25° C. of 100 to 500,000 centipoise, the weight ratio of said resin (i) to said polymer being (ii) in the range 40:60 to 75:25;
   (iii) a ketoximosilane of the formula $R'_{4-y}SiX_y$, wherein R' is selected from the group consisting of hydrocarbon radicals and halogenated hydrocarbon radical having 1–10 carbon atoms, X is a $-ON=C(R'')R'''$, in which R'' and R''' are selected from the group consisting of alkyl radicals having 1–8 carbon atoms and phenyl radical, and y is 3 or 4, the amount of said ketoximosilane being sufficient to provide a molar ratio of X groups to total hydroxyl groups on said resin (i) and said diorganopolysiloxane (ii) of 0.9 to 3; and
   (iv) optionally, sufficient catalyst to accelerate the cure of said composition,
   said composition being an essentially solvent-free non-slump solid at room temperature, being extrudable at $\leq 150°$ C. and forming an essentially tack-free elastomer when cured.

2. The composition according to claim 1, wherein R of said resin (i) is methyl and said polydiorganosiloxane (ii) is polydimethylsiloxane.

3. The composition according to claim 2, wherein the viscosity of said polydiorganosiloxane (ii) is 500 to 50,000 cP at 25° C.

4. The composition according to claim 3, wherein the molar ratio of the ketoxime groups of said ketoximosilane (iii) to the total hydroxyl functionality on said resin (i) and said polydiorganosiloxane (ii) is 1.2 to 2.1.

5. The composition according to claim 4, wherein said ketoximosilane (iii) is selected such that y is 3, R' is selected from the group consisting of methyl, vinyl and phenyl and R'' and R''' are each selected from alkyl radicals having 1 to 8 carbon atoms.

6. The composition according to claim 5, wherein the weight ratio of said resin (i) to said polydiorganosiloxane (ii) is 55/45 to 65/35.

7. The composition according to claim 1, wherein the weight ratio of said resin (i) to said polydiorganosiloxane (ii) is 55/45 to 65/35.

8. The composition according to claim 2, wherein hydroxyl content of said resin (i) is 2 to 4 weight percent.

9. The composition according to claim 8, wherein the viscosity of said polydiorganosiloxane (ii) is 500 to 50,000 cP at 25° C.

10. The composition according to claim 9, wherein the molar ratio of the ketoxime groups of said ketoximosilane (iii) to the total hydroxyl functionality on said resin (i) and said polydiorganosiloxane (ii) is 1.2 to 2.1.

11. The composition according to claim 10, wherein said ketoximosilane (iii) is selected such that y is 3, R' is selected from the group consisting of methyl, vinyl and phenyl and R'' and R''' are each selected from alkyl radicals having 1 to 8 carbon atoms.

12. The composition according to claim 11, wherein the weight ratio of said resin (i) to said polydiorganosiloxane (ii) is 55/45 to 65/35.

13. A moisture-curable silicone hot-melt adhesive composition prepared by a process comprising:

(A) mixing an organic solvent solution of
  (i) a solid hydroxyl-functional organopolysiloxane resin comprising $R_3SiO_{\frac{1}{2}}$ siloxane units and $SiO_{4/2}$ siloxane units, wherein the mole ratio of the $R_3SiO_{\frac{1}{2}}$ siloxane units to $SiO_{4/2}$ siloxane units has a value of from 0.5/1 to 1.2/1, R is selected from the group consisting of hydrocarbon radicals and halogenated hydrocarbon radicals; with
  (ii) a diorganopolysiloxane polymer having silicon-bonded hydroxyl terminal groups and having a viscosity at 25° C. of 100 to 500,000 centipoise, the weight ratio of said resin (i) to said polymer being (ii) in the range 40:60 to 75:25;
(B) thoroughly blending the combination of (i) and (ii) with
  (iii) a ketoximosilane of the formula $R'_{4-y}SiX_y$, wherein R' is selected from the group consisting of hydrocarbon radicals and halogenated hydrocarbon radical having 1–10 carbon atoms, X is a $-ON=C(R'')R'''$, in which R'' and R''' are selected from the group consisting of alkyl radicals having 1–8 carbon atoms and phenyl radical, and y is 3 or 4, the amount of said ketoximosilane being sufficient to provide a molar ratio of X groups to total hydroxyl groups on said resin (i) and said diorganopolysiloxane (ii) of 0.9 to 3; and
(C) stripping off said organic solvent, to form a composition which is an essentially solvent-free non-slump solid at room temperature, is extrudable at $\leq 150°$ C. and forms an essentially tack-free elastomer when cured.

14. The composition according to claim 13, wherein R of said resin (i) is methyl and said polydiorganosiloxane (ii) is polydimethylsiloxane.

15. The composition according to claim 14, wherein the viscosity of said polydiorganosiloxane (ii) is 500 to 50,000 cP at 25° C.

16. The composition according to claim 15, wherein the molar ratio of the ketoxime groups of said ketoximosilane (iii) to the total hydroxyl functionality on said resin (i) and said polydiorganosiloxane (ii) is 1.2 to 2.1.

17. The composition according to claim 16, wherein said ketoximosilane (iii) is selected such that y is 3, R' is selected from the group consisting of methyl, vinyl and phenyl and R'' and R''' are each selected from alkyl radicals having 1 to 8 carbon atoms.

18. The composition according to claim 17, wherein hydroxyl content of said resin (i) is 2 to 4 weight percent.

19. The composition according to claim 18, wherein the viscosity of said polydiorganosiloxane (ii) is 500 to 50,000 cP at 25° C.

20. The composition according to claim 19, wherein the molar ratio of the ketoxime groups of said ketoximosilane (iii) to the total hydroxyl functionality on said resin (i) and said polydiorganosiloxane (ii) is 1.2 to 2.1.

21. The composition according to claim 20, wherein said ketoximosilane (iii) is selected such that y is 3, R' is selected from the group consisting of methyl, vinyl and phenyl and R'' and R''' are each selected from alkyl radicals having 1 to 8 carbon atoms.

22. The composition according to claim 21, wherein the weight ratio of said resin (i) to said polydiorganosiloxane (ii) is 55/45 to 65/35.

* * * * *